US011858015B2

(12) United States Patent
Wu

(10) Patent No.: US 11,858,015 B2
(45) Date of Patent: Jan. 2, 2024

(54) AUTO-FEED PIPE CLEANER

(71) Applicant: Kuei-Kun Wu, Kaohsiung (TW)

(72) Inventor: Kuei-Kun Wu, Kaohsiung (TW)

( * ) Notice: Subject to any disclaimer, the term of this patent is extended or adjusted under 35 U.S.C. 154(b) by 382 days.

(21) Appl. No.: 17/203,177

(22) Filed: Mar. 16, 2021

(65) Prior Publication Data

US 2022/0203414 A1 Jun. 30, 2022

(30) Foreign Application Priority Data

Dec. 25, 2020 (TW) ................................ 109146167

(51) Int. Cl.
*B08B 9/045* (2006.01)
*E03C 1/302* (2006.01)

(52) U.S. Cl.
CPC .............. *B08B 9/045* (2013.01); *E03C 1/302* (2013.01); *B08B 2209/04* (2013.01)

(58) Field of Classification Search
CPC .. E03C 1/30; E03C 1/302; E03F 9/002; E03F 9/005; B08B 9/043; B08B 9/045; B08B 2209/04; B65H 57/00; B65H 57/12
USPC .......................... 15/104.095, 104.33, 104.09
See application file for complete search history.

(56) References Cited

U.S. PATENT DOCUMENTS

| | | | | |
|---|---|---|---|---|
| 6,158,076 | A | 12/2000 | Rutkowski | |
| 8,826,483 | B2 * | 9/2014 | Rutkowski | G05G 5/005 242/395 |
| 10,189,060 | B2 * | 1/2019 | Hsu | E03F 9/005 |
| 2020/0002931 | A1 * | 1/2020 | Hsu | E03F 9/005 |
| 2022/0098849 | A1 * | 3/2022 | Berg, Jr. | E03F 9/005 |

* cited by examiner

*Primary Examiner* — Don M Anderson
*Assistant Examiner* — Jason Khalil Hawkins
(74) *Attorney, Agent, or Firm* — Muncy, Geissler, Olds & Lowe, P.C.

(57) ABSTRACT

An auto-feed pipe cleaner comprises a take-up unit comprising a wire drum and a spring wire; and a feed unit comprising a telescopic tube, a feeder for disposing a movable bearing and two fixed bearings, a tube handle disposed inside the telescopic tube and embedded with the feeder, and an elastic plate embedded inside the feeder. A user holds the telescopic tube with one hand, and holds a small handle of the wire drum with another hand to rotate the wire drum forwardly or reversely and drive the spring wire to rotate forwardly or reversely, and pushes the telescopic tube forward so that the movable bearing is pressed downward by the elastic plate and actuated with the fixed bearings to start feeding the spring wire or taking up the spring wire into the wire drum. When the telescopic tube is pulled backward, the movable bearing is not actuated.

10 Claims, 14 Drawing Sheets

AUTO-FEED PIPE CLEANER

FIELD OF THE INVENTION

The invention relates to a pipe cleaner, and more particularly to an auto-feed pipe cleaner.

BACKGROUND OF THE INVENTION

Please refer to FIG. 1. U.S. Pat. No. 6,158,076 discloses a pipe cleaner, a pipe cleaner 1 comprises a wire housing 11, and the wire housing 11 comprises a crank 12 disposed on one end of the wire housing 11, and a tube 13 disposed on the other end of the wire housing 11 opposite to the crank 12. One end of the tube 13 is provided with three obliquely installed bearings 14 and a spring wire 15 partially accommodated in the wire housing 11, and one end of the spring wire 15 is protruded outside from the tube 13. When a drain pipe is blocked, a user operates the pipe cleaner 1 by holding a grip 16 and a pressing portion 17 disposed under the tube 13 with one hand, and holding the crank 12 with another hand. When the pressing portion 17 is pressed by fingers, the three obliquely installed bearings 14 are evenly pressed on the spring wire 15 at an oblique angle, and the three obliquely installed bearings 14 have no power. At this time, the crank 12 is rotated clockwise to drive the wire housing 11 rotating clockwise together, so that the spring wire 15 accommodated in the wire housing 11 is fed outwardly, and the three obliquely installed bearings 14 will push the spring wire 15 forward. When the wire housing 11 is rotated counterclockwise, the spring wire 15 will be retracted backward. When the pipe cleaner 1 is used, the user has to rotate the crank 12 with hand and to press the pressing portion 17 with another hand at the same time, which is troublesome and inconvenience to operate.

In addition, the industry has developed another pipe cleaner 2 as shown in FIG. 2. The pipe cleaner 2 comprises a body 21, a grip 22 disposed at one end of the body 21 near an outer side, a clamped portion 23 disposed at a center position of the body 21, and an outer tube 24 disposed on one end of the body 21 opposite to the grip 22. An adjusting member 26 is provided on the outer tube 24, and a spring wire 25 is accommodated inside the body 21. One end of the spring wire 25 is protruded outside from the outer tube 24, and the adjusting member 26 is used for controlling so that a single bearing (not shown in the figure) is pressed downward and the spring wire 25 is fed outwardly from the body 21.

When operating the pipe cleaner 2, the user holds a handle 27 disposed below the outer tube 24 with one hand, and holds and rotates the grip 22 to drive the body 21 to rotate with another hand, so that the spring wire 25 in the body 21 can be fed outwardly or retracted. In addition to operate the pipe cleaner 2 manually, the pipe cleaner 2 may include an electric drill 28 to replace the grip 22 for clamping the clamped portion 23. Since the pipe cleaner 2 is not provided with a clutch device, when the spring wire 25 is inserted into positions deep inside a drain pipe and hits an excessively large obstruction with a large resistance, the spring wire 25 will not stop and will not retract backward, which can easily cause damage to the pipe cleaner 2, and the spring wire 25 is knotted and twisted, which needs further improvement.

SUMMARY OF THE INVENTION

A main object of the invention is to solve the problems derived from the structure of the other pipe cleaner mentioned above.

In order to achieve the above-mentioned object, the invention provides an auto-feed pipe cleaner, which is a pipe cleaner aimed at unblocking pipelines. The pipe cleaner comprises a take-up unit and a feed unit. The take-up unit comprises a wire drum and a spring wire, wherein the wire drum comprises a front cover and a rear cover assembled with the front cover, a flange tube is provided in an extension direction at one side of the front cover without assembling with the rear cover, and a through hole is formed in the flange tube for communicating with an inner hollow of the front cover, and the front cover includes a first opening communicating with the inner hollow of the front cover and facing toward one end of the flange tube, the rear cover includes a second opening communicating with an inner hollow of the rear cover and corresponding to one end of the front cover, and the rear cover is provided with a small handle at a side opposite to the second opening to drive the wire drum rotating, the spring wire is accommodated in the inner hollows of the front cover and the rear cover, and one end of the spring wire protrudes from the through hole of the flange tube. The feed unit comprises a telescopic tube, a feeder, a tube handle and an elastic plate, wherein an inside of the telescopic tube is hollow, an inner top of the telescopic tube is provided with a groove portion, the feeder is disposed at the inside of the telescopic tube, and a movable bearing and two fixed bearings are obliquely disposed in the feeder, the tube handle is sleeved on the flange tube of the front cover, one end of the tube handle is embedded with one end of the feeder and disposed at the inside of the telescopic tube which is capable of moving forward and backward outside the feeder and the tube handle, and a folded end of the elastic plate is embedded in the groove portion of the telescopic tube; the wire drum is rotated to drive the spring wire to rotate clockwise or anti-clockwise; if the telescopic tube is pushed forward to press against the movable bearing, the movable bearing is pressed downward and actuated with the fixed bearings, the spring wire is evenly pressed between the movable bearing and the fixed bearings, and the spring wire is fed or taken up into the wire drum; and if the telescopic tube is pulled backward, the movable bearing rises and is not actuated with the fixed bearings, and the spring wire is not fed nor taken up into the wire drum.

Further, an outer periphery of the flange tube of the front cover comprises a plurality of convex strips disposed at intervals, and a round convex portion is provided at the extension direction that the front cover connected with the flange tube, and the front cover comprises a plurality of locking holes and a plurality of protruding rods disposed at intervals on an inner periphery of the first opening, and wherein the rear cover comprises a plurality of fixing rods and a plurality of sleeve rods disposed at intervals on an inner periphery of the second opening, the plurality of fixing rods are inserted by a plurality of screws to be locked with the plurality of locking holes, and the plurality of protruding rods are correspondingly connected with the plurality of sleeve rods, and a concave portion is provided at a side opposite to the second opening of the rear cover, and the concave portion is provided with a convex rim with an inverted convex hole at a side that the second opening is located, and a plurality of convex dots are disposed at intervals on an outer periphery of the convex rim, the small handle is provided with a convex connecting rod, and a hollow cylinder is embedded with one end of the convex connecting rod and is sleeved on the convex connecting rod.

Further, the telescopic tube comprises a first half tube and a second half tube assembled with the first half tube, a first inner space is provided in the first half tube and a second inner space is provided in the second half tube, a first accommodating portion is extended upward from the first half tube and a second accommodating portion is extended upward from the second half tube, and an inside of the first accommodating portion and an inside of the second accommodating portion, the first inner space and the second inner space are provided for disposal of the feeder and the tube handle, the first half tube is provided with a first holding part and the second half tube is provided with a second holding part, and the first holding part and the second holding part are adjacent to one end of the wire drum, the first holding part includes a first half sleeve hole and the second holding part includes a second half sleeve hole, and the first half sleeve hole and the second half sleeve hole are assembled to provide a sleeve hole for disposal of one end of the tube handle, a first semicircular hole is provided at one end of the first half tube opposite to the first half sleeve hole, and a second semicircular hole is provided at one end of the second half tube opposite to the second half sleeve hole, the first semicircular hole and the second semicircular hole are assembled as a round hole for the spring wire to protrude or take up, wherein the groove portion of the telescopic tube is divided into a first groove at an inner top of the first accommodating portion and a second groove at inner top of the second accommodating portion to provide a folded end of the elastic plate for embedding therein, and a protruding part and a recessed part are provided at an joining position of the first half tube and the second half tube, inner peripheries of the first half tube and the second half tube are respectively provided with a plurality of locking parts for a plurality of screws to be screwed and inserted to combine and fix the first half tube with the second half tube.

Further, the feeder comprises a first feeder body and a second feeder body assembled with the first feeder body from top to bottom, a flange joint portion is formed in a direction extended upward from the first feeder body, a hollow hole is provided in the flange joint portion, a top end of the flange joint portion is provided with a notch, and a bottom end of the hollow hole of the flange joint portion is provided with an adaptor and a guiding tenon protruding from an inner edge of the adaptor, and the movable bearing is inserted from the hollow hole of the flange joint portion, the first feeder body is extended downward to form an engaging convex body, the second feeder body is provided with two fixing parts which are relatively staggered and obliquely disposed on an inner periphery of one side of the second feeder body, one side of the two fixing parts is y axially connected with the fixed bearings, and a slot is provided on an inner periphery of one end of the second feeder body where is corresponding to the engaging convex body, inner peripheries of the first feeder body and the second feeder body are respectively provided with a plurality of locking portions, and a plurality of screws to screw and insert into the plurality of locking portions to combine and fix the first feeder body with the second feeder body.

Further, the movable bearing comprises a movable fixing shaft, a bearing, a spring and a steel ball, a flange joint body is provided at a top of the movable fixing shaft for placing the steel ball, the flange joint body extends downwardly to form a vertical rod, and an outer diameter of the vertical rod is smaller than an outer diameter of the flange joint body, an end of the vertical rod is provided with a groove to be inserted by the bearing, and a first fixing member is inserted into the end of the vertical rod to axially connect the bearing, and the bearing rotates in the groove, the spring is sleeved on an outer periphery of the vertical rod and abutted between the flange joint body and the first fixing member, an elongated slot is provided at an outer side of the vertical rod where the first fixing member passes through, the movable fixing shaft is obliquely inserted into the hollow hole of the flange joint portion, and the bearing is axially connected in the groove, and the flange joint body of the movable fixing shaft is abutted on the adaptor, the movable fixing shaft moves upward and downward through the disposal of the spring sleeved on the outer periphery of the vertical rod, and the movable bearing moves upward and downward in the hollow hole of the flange joint portion.

Further, two second fixing members are respectively inserted into the two fixing parts to axially connect the two fixed bearings, and enable the two fixed bearings rotating on one side of the fixing parts.

Further, the tube handle comprises a convex tube section disposed at one end of the tube handle, an outer sleeve disposed at the other end of the tube handle, and a via hole is located in the tube handle, the convex tube section is provided with a convex tube section slot and a block which is disposed opposite to the convex tube section slot on an outer side of the convex tube section, the convex tube section slot is provided for engaging and fixing the engaging convex body of the first feeder body, and the block is jammed and fixed in the slot of the second feeder body, the outer sleeve of the tube handle abuts on the round convex portion of the front cover, the via hole of the tube handle is inserted by the flange tube, and the plurality of convex strips of the flange tube contact with the via hole, and the flange tube of the wire drum is rotated in the via hole.

Further, the folded end of the elastic plate is an elongate shape, and the other end of the elastic plate is inclined downward to form a hook, and the hook of the elastic plate is located in the hollow hole of the flange joint portion and the notch of the flange joint portion.

Further, the take-up unit further includes a clutch device installed on the rear cover of the wire drum.

Further, the clutch device comprises a first sleeve, a second sleeve, a central shaft, a compression spring, a first gasket, a second gasket, and a fixing plate, the first sleeve is provided with a cover abutting on the concave portion of the rear cover, and an inside of the cover extends outward to form an outer cylinder with a third opening, and the inside of the cover is provided with a screw hole communicating with the third opening, a chamber is formed from inside the outer cylinder for sleeving the compression spring, a bottom of the chamber is abutted by the first gasket and an end of the compression spring, the second sleeve is provided with a convex cover embedded and positioned in the inverted convex hole of the convex rim, and a convex cover rod on the convex cover for sleeving with the compression spring, a shaft hole is disposed inside the convex cover and the convex cover rod, the convex cover includes a plurality of embedding grooves adjacent to the shaft hole, and a plurality of holes are located on an outer periphery of the convex cover for the convex dots of the concave portion to tenon, an external screw thread is provided at one end of the convex cover rod to screw joint with the screw hole of the cover, the central shaft is provided with a disc surface with a hexagon head, and a shaft is located at one side of the disc surface opposite to the hexagon head, and the shaft protrudes from the convex cover rod, the disc surface is provided with a plurality of convex embedding parts adjacent to the shaft and corresponding to one side of the second sleeve for embedding with or detaching from the plurality of embedding grooves, and a plurality of abutting convex dots disposed between the plurality of convex embedding parts to abut against the convex cover, the first gasket includes a first inner hole, the second gasket includes a second inner hole, and the fixing plate includes a third inner hole, and wherein the external screw thread of the convex cover rod is inserted into the first inner hole, and one end of the shaft opposite to the hexagon head is inserted into the second inner hole of the second gasket and protruded out from the third inner hole of the fixing plate, and the fixing plate is fixed on the second gasket together with the shaft, the second gasket and the fixing plate into one body, thereby the shaft is capable of moving forward and backward in the chamber of the outer cylinder through an action of the compression spring.

Compared with the prior art, the invention has the following features: the auto-feed pipe cleaner of the invention through which a user holds the telescopic tube with one hand, and holds the small handle of the wire drum or an electric drill installed on the wire drum additionally with another hand to rotate the wire drum forwardly and drive the spring wire to rotate forwardly, and pushes the telescopic tube forward with one hand so that the movable bearing is pressed downward by the elastic plate and actuated with the fixed bearings to start feeding the spring wire. When the telescopic tube is pulled backward, the movable bearing is not actuated in order to stop the spring wire from feeding. Contrarily, when the wire drum is rotated reversely to drive the spring wire to rotate reversely, the telescopic tube is pushed forward with one hand so that the movable bearing is pressed downward by the elastic plate and actuated with the fixed bearings to start taking up the spring wire into the wire drum, and when the telescopic tube is pulled backward, the movable bearing is not actuated to stop the spring wire from taking up in order to achieve convenient operation.

DETAILED DESCRIPTION OF THE PREFERRED EMBODIMENTS

Figure 1:
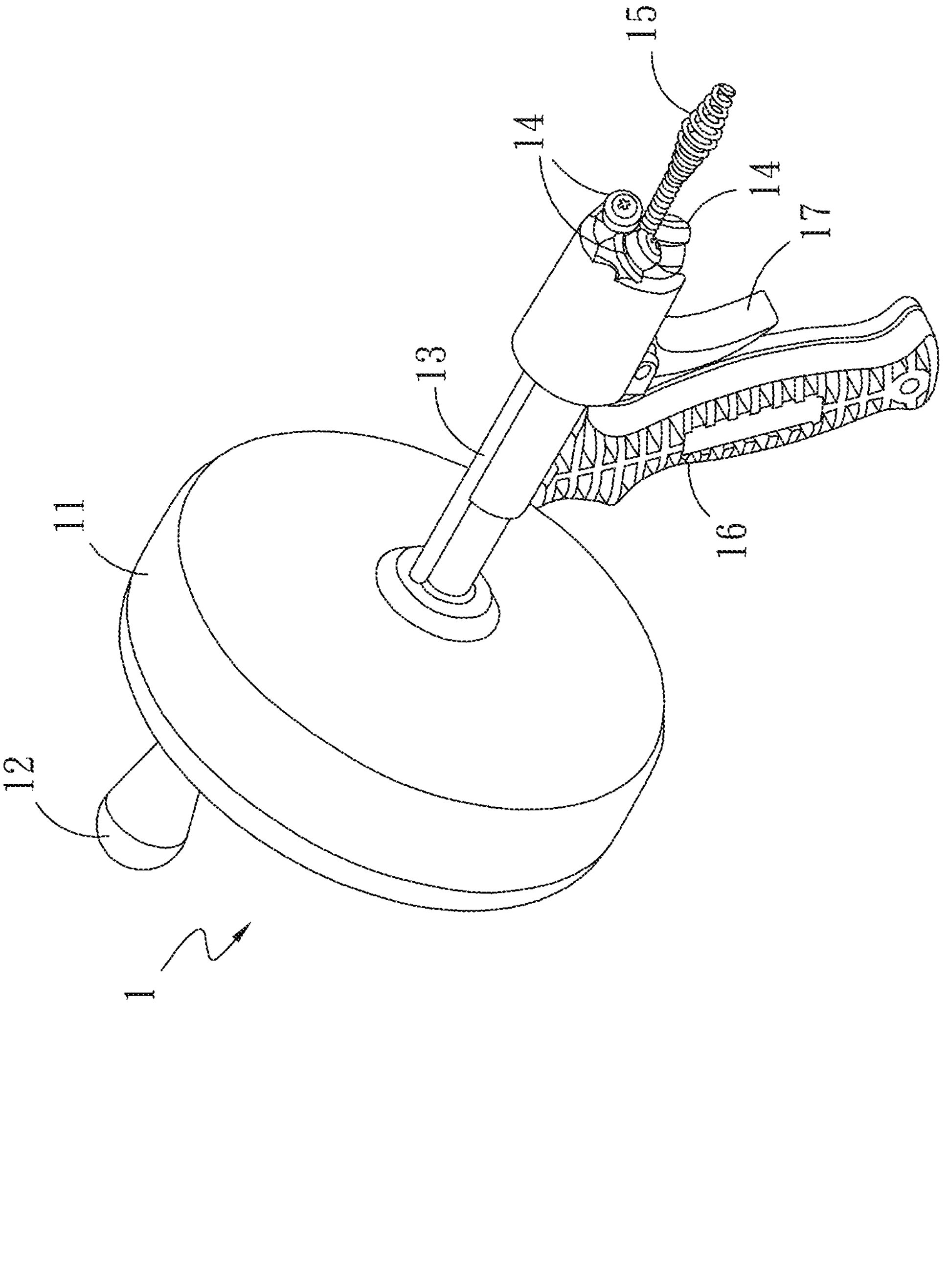
Fig.1 PRIOR ART
FIG. 1 is a perspective view of an existing pipe cleaner of U.S. Pat. No. 6,158,076.
Figure 2:
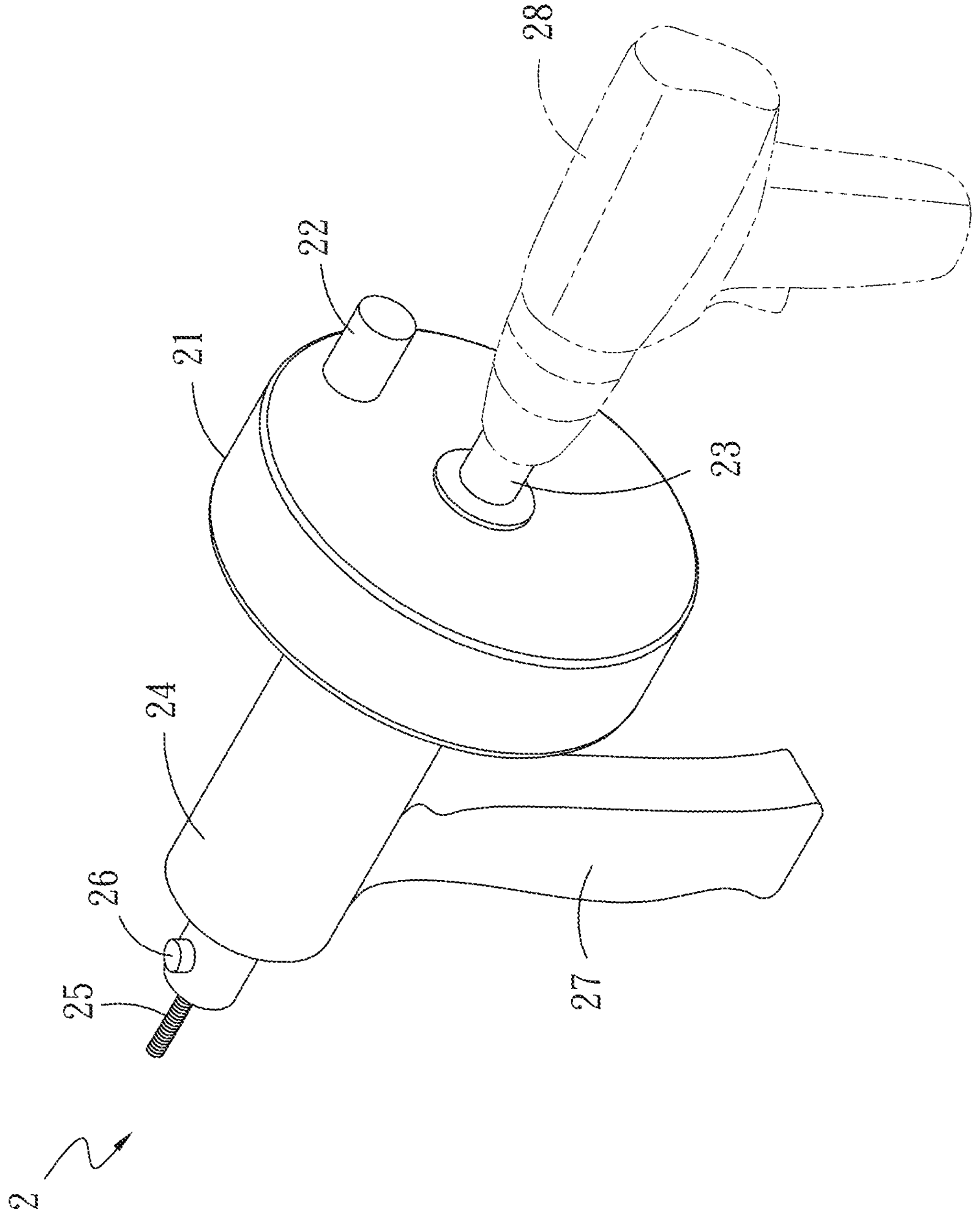
Fig.2 PRIOR ART
FIG. 2 is a perspective view of another existing pipe cleaner.
Figure 3:
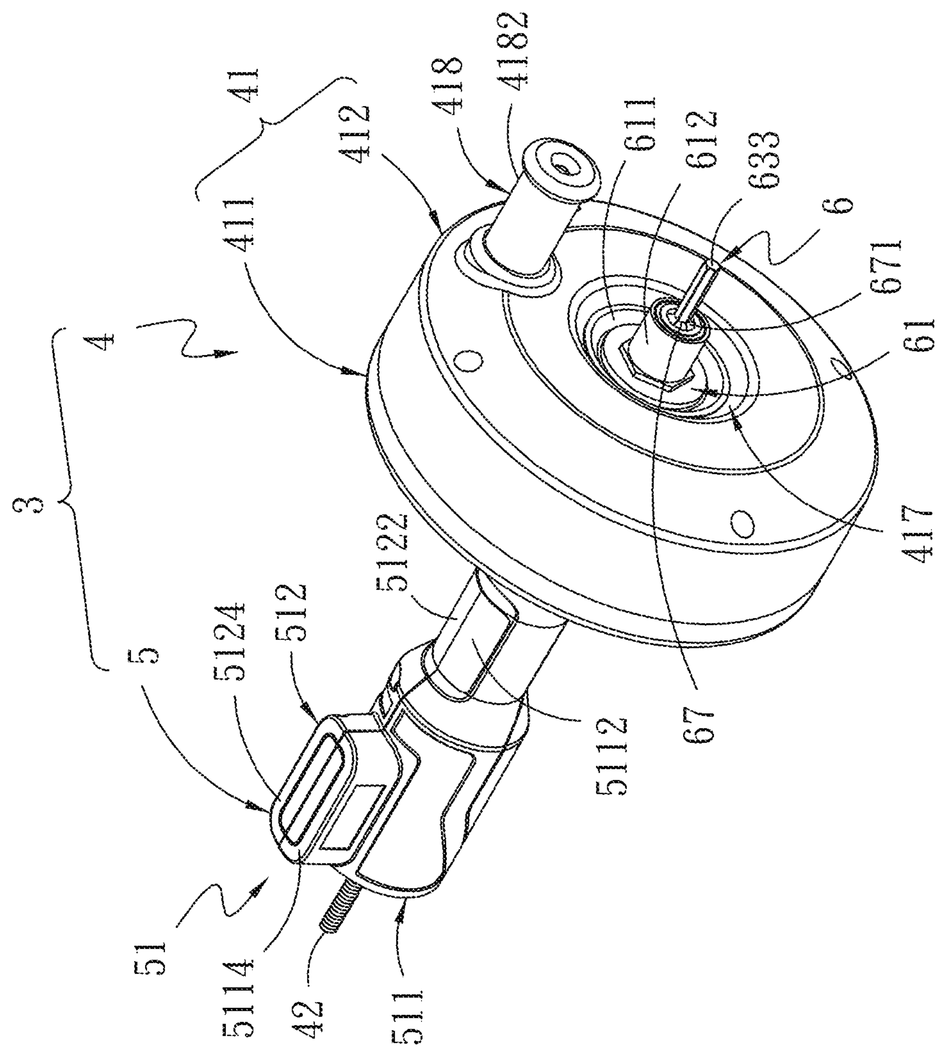
FIG. 3 is a perspective view of a pipe cleaner of the invention.
Figure 4:
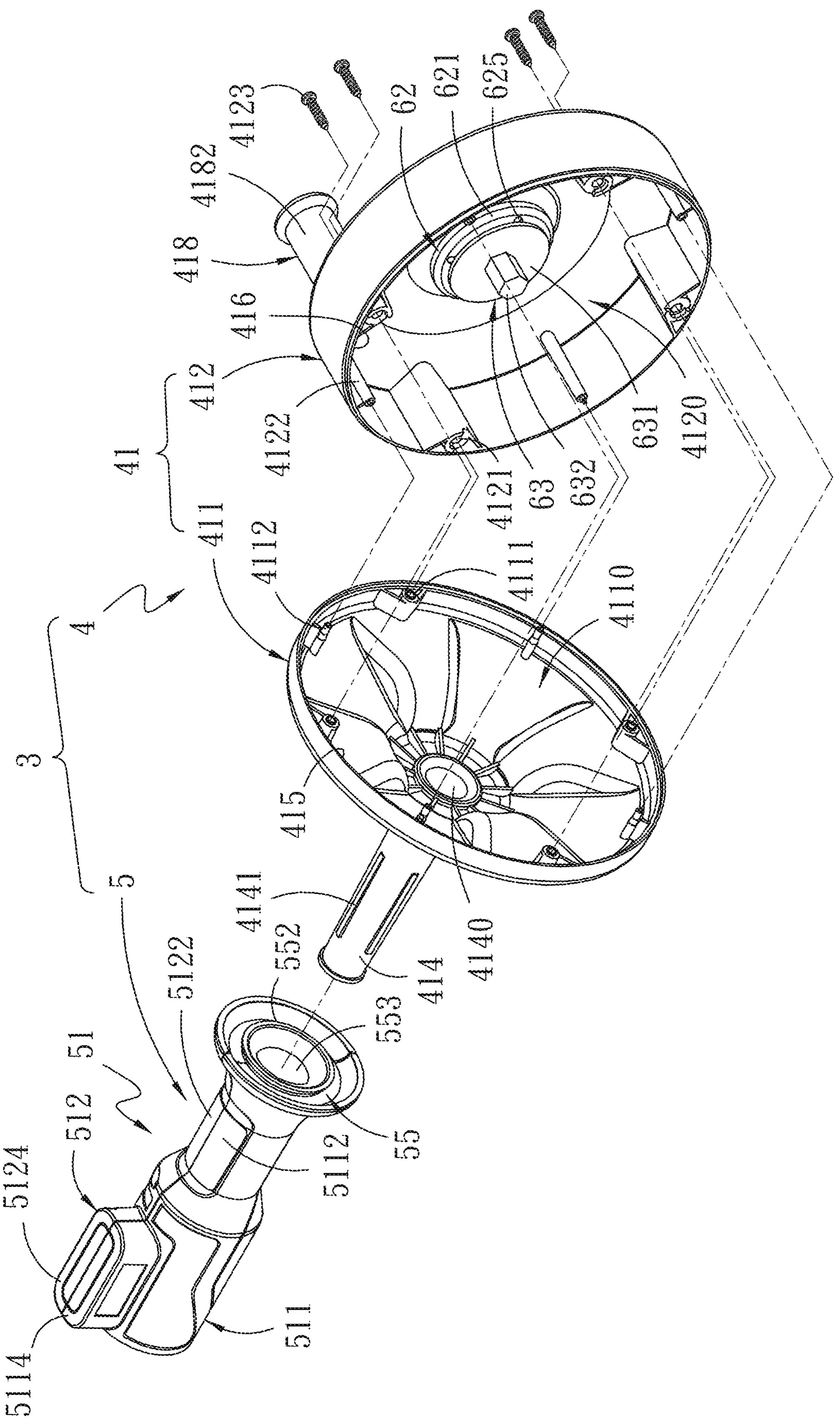
FIG. 4 is a perspective exploded view of the pipe cleaner of FIG. 3.
Figure 5:
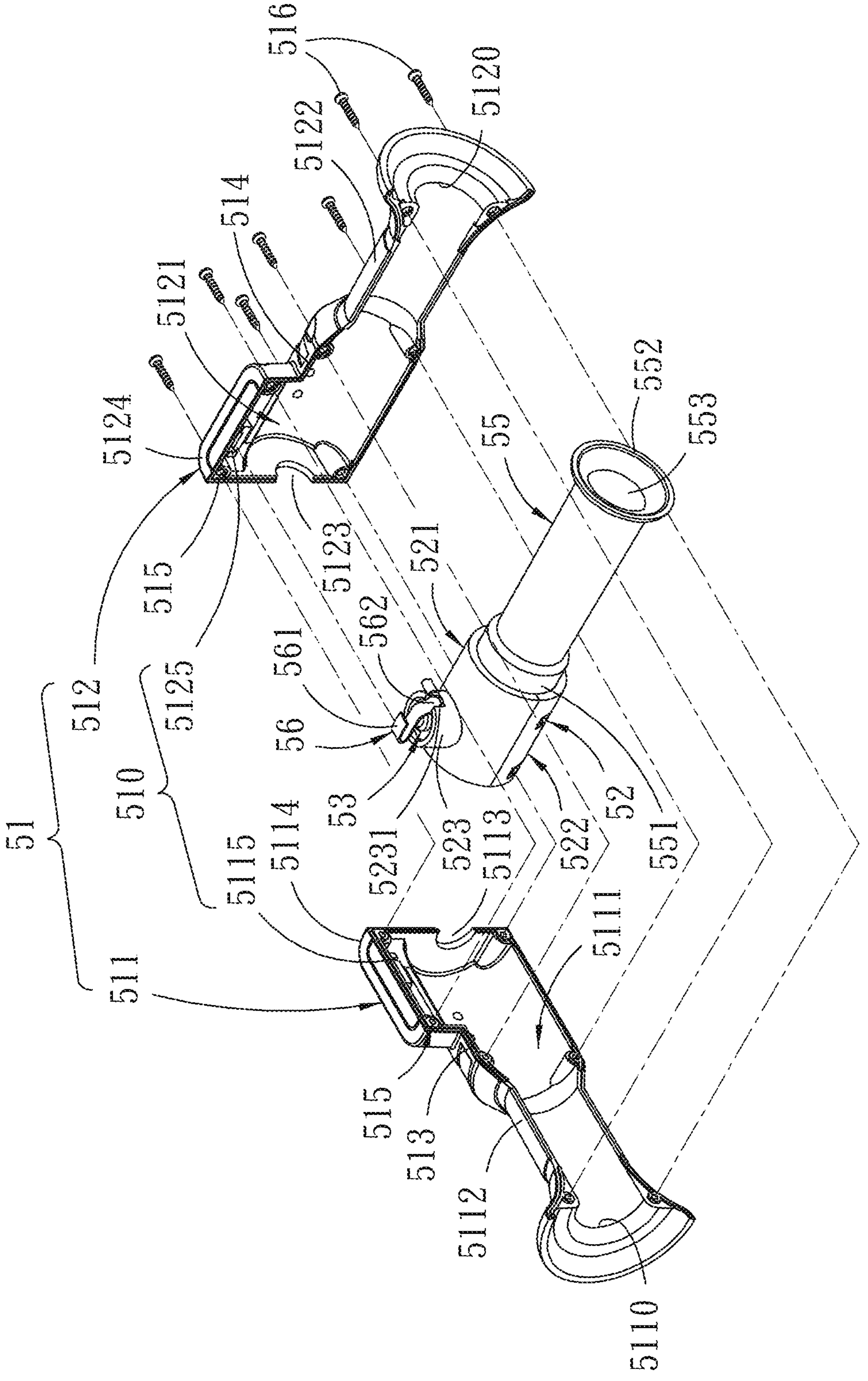
FIG. 5 is a perspective exploded view of a feed unit of the pipe cleaner of FIG. 3.
Figure 6:
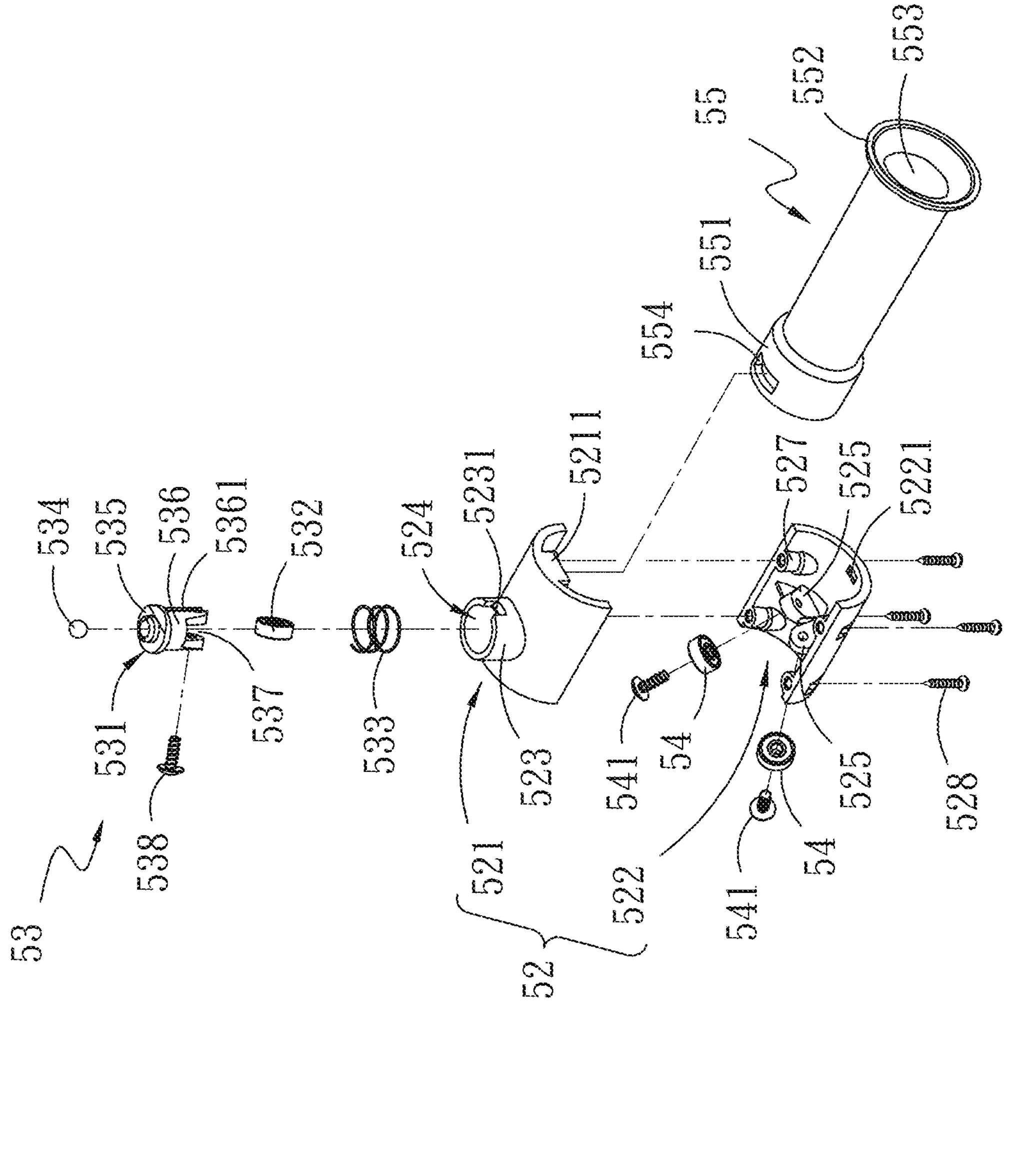
FIG. 6 is a top perspective exploded view of the feed unit of the pipe cleaner of the invention.
Figure 7:
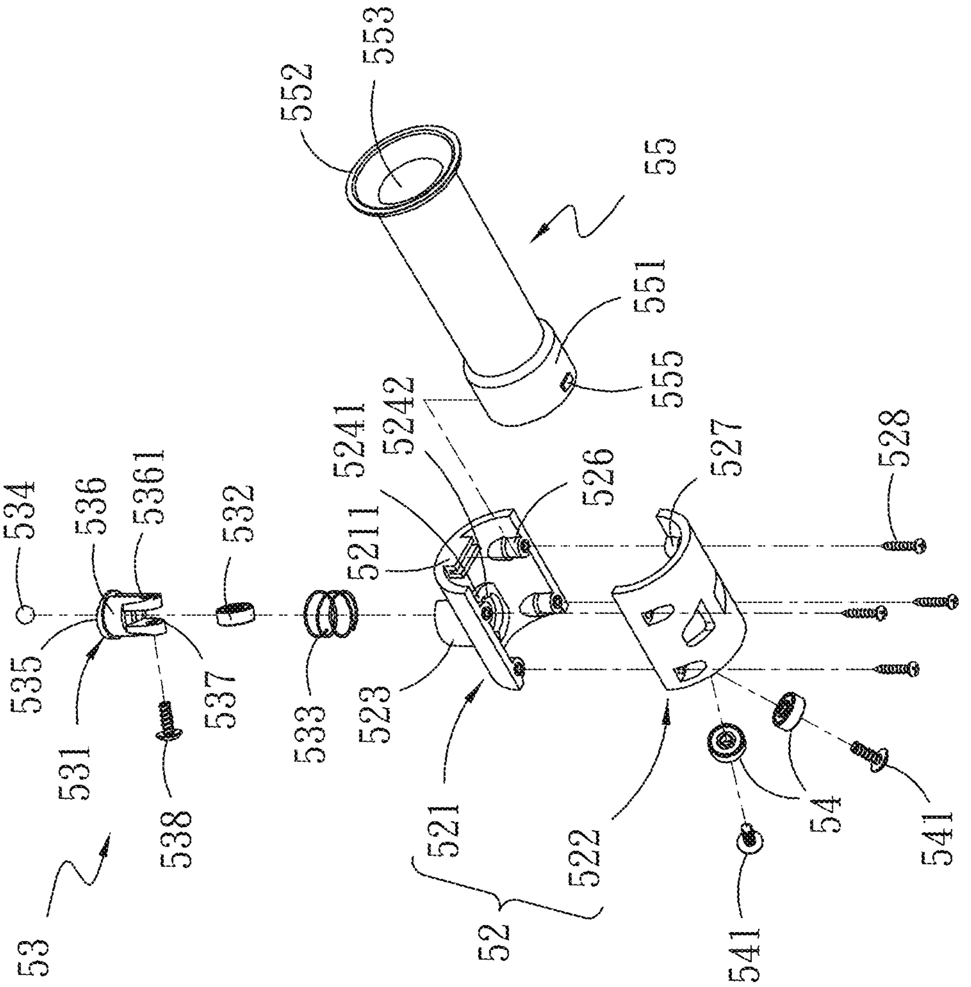
FIG. 7 is a bottom perspective exploded view of the feed unit of the pipe cleaner of the invention.
Figure 8:
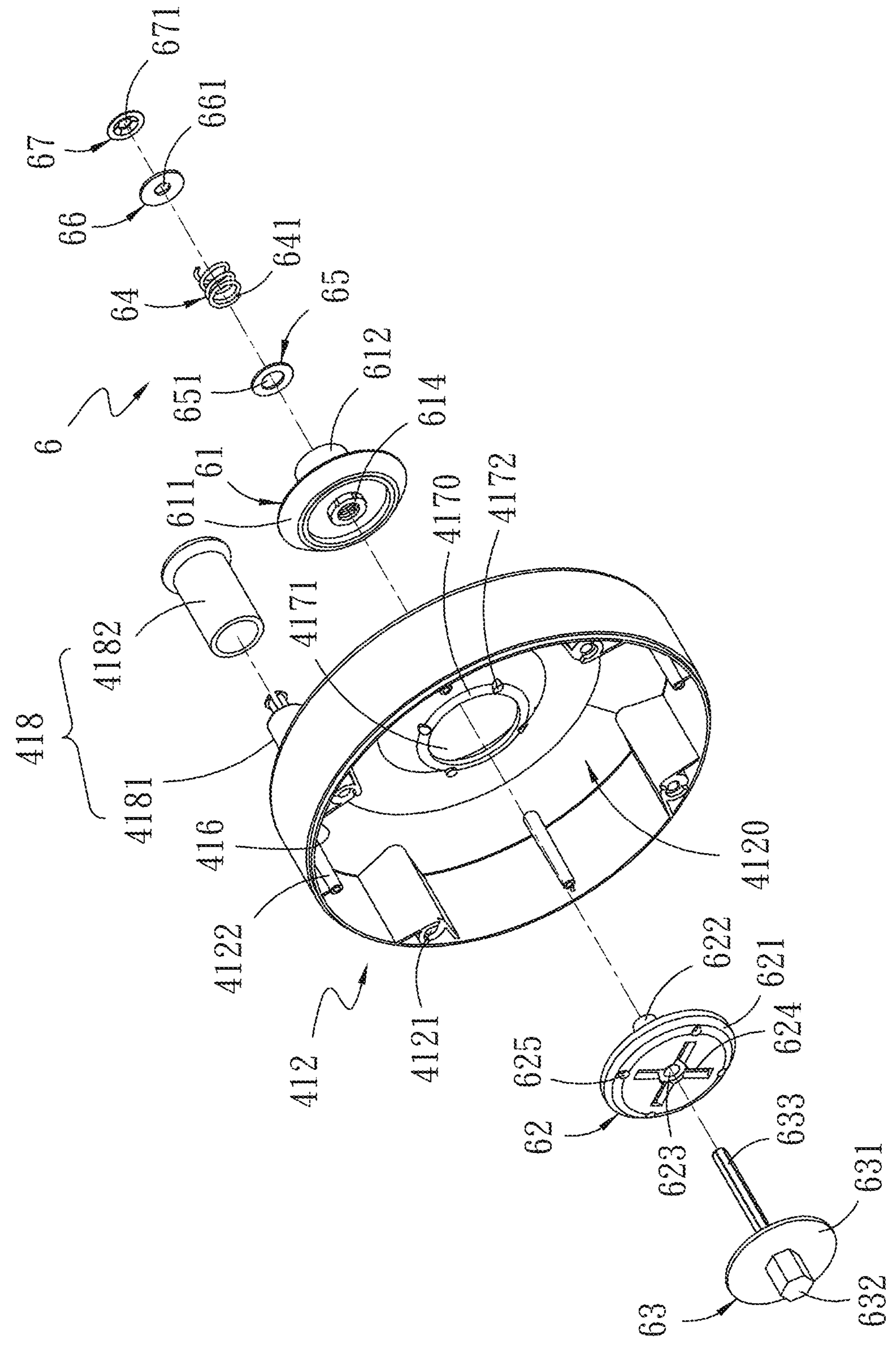
FIG. 8 is a perspective exploded view of a rear cover and a clutch device of a take-up unit of FIG. 3.
Figure 9:
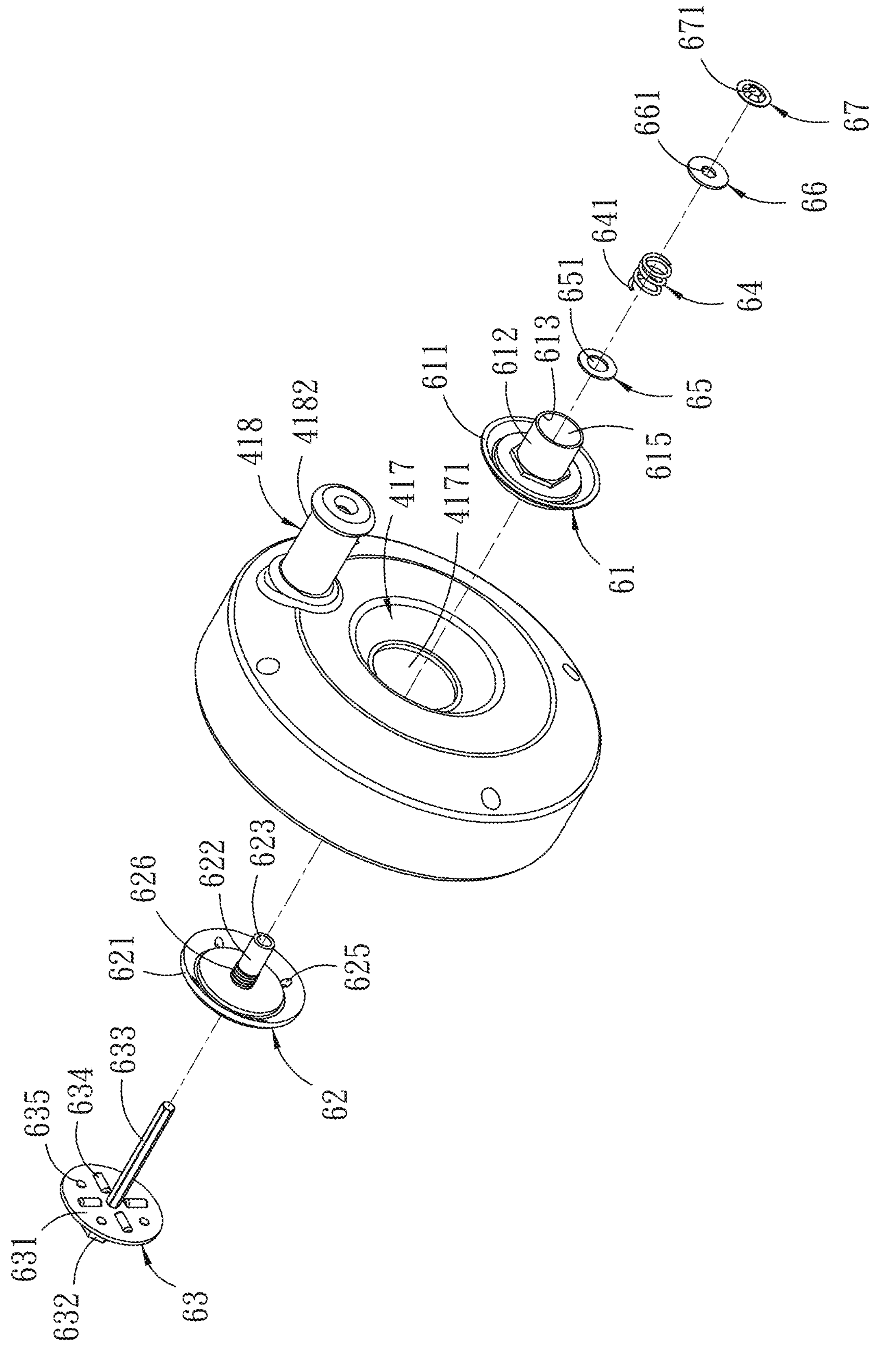
FIG. 9 is a perspective exploded view of the rear cover and the clutch device of the take-up unit of FIG. 8 viewed from another angle.

The detailed description and technical contents of the present invention are described below with reference to the drawings.

Please refer to FIG. 3, FIG. 4, FIG. 5, FIG. 6, FIG. 7 and FIG. 10. The invention provides an auto-feed pipe cleaner for clearing pipelines. A pipe cleaner 3 comprises a take-up unit 4 and a feed unit 5, wherein the take-up unit 4 comprises a wire drum 41 and a spring wire 42 accommodated in the wire drum 41, and the wire drum 41 comprises a front cover 411, and a rear cover 412 assembled with the front cover 411. A flange tube 414 is provided in an extension direction at one side of the front cover 411 without assembling with the rear cover 412, and a round convex portion 413 is provided at the extension direction that the front cover 411 connected with the flange tube 414. A through hole 4140 is formed in the flange tube 414 for communicating with an inner hollow 4110 of the front cover 411, and an outer periphery of the flange tube 414 includes a plurality of convex strips 4141 disposed at intervals. The front cover 411 includes a first opening 415 communicating with the inner hollow 4110 of the front cover 411 and facing toward one end of the flange tube 414, and the front cover 411 includes a plurality of locking holes 4111 and a plurality of protruding rods 4112 disposed at intervals on an inner periphery of the first opening 415. The rear cover 412 includes a second opening 416 communicating with an inner hollow 4120 of the rear cover 412 and corresponding to one end of the front cover 411, and the rear cover 412 includes a plurality of fixing rods 4121 and a plurality of sleeve rods 4122 disposed at intervals on an inner periphery of the second opening 416, the plurality of fixing rods 4121 are inserted by a plurality of screws 4123 to be locked with the plurality of locking holes 4111, and the plurality of protruding rods 4112 are correspondingly connected with the plurality of sleeve rods 4122. A concave portion 417 is provided at a side opposite to the second opening 416 of the rear cover 412, and the concave portion 417 is provided with a convex rim 4170 with an inverted convex hole 4171 at a side that the second opening 416 is located, wherein a plurality of convex dots 4172 are disposed at intervals on an outer periphery of the convex rim 4170. The rear cover 412 is provided with a small handle 418 at the side opposite to the second opening 416, the small handle 418 is provided with a convex connecting rod 4181, and a hollow cylinder 4182 for embedding with one end of the convex connecting rod 4181 so that the hollow cylinder 4182 is sleeved on the convex connecting rod 4181 to drive the wire drum 41 rotating. The spring wire 42 is accommodated in the inner hollow 4110 of the front cover 411 and the inner hollow 4120 of the rear cover 412, one end of the spring wire 42 protrudes from the through hole 4140 of the flange tube 414, and the end of the spring wire 42 can be made into a hook to facilitate hooking of obstructions in a drain pipe.

The feed unit 5 comprises a telescopic tube 51, a feeder 52, a tube handle 55 and an elastic plate 56, wherein an inside of the telescopic tube 51 is hollow, an inner top of the telescopic tube 51 is provided with a groove portion 510, the feeder 52 is disposed at the inside of the telescopic tube 51, and a movable bearing 53 and two fixed bearings 54 are obliquely disposed in the feeder 52. The tube handle 55 is sleeved on the flange tube 414 of the front cover 411, one end of the tube handle 55 is embedded with one end of the feeder 52 and disposed at the inside of the telescopic tube 51, so that the telescopic tube 51 is capable of moving forward and backward outside the feeder 52 and the tube handle 55, and a folded end 561 of the elastic plate 56 is embedded in the groove portion 510 of the telescopic tube 51.

In one embodiment, the telescopic tube 51 comprises a first half tube 511 and a second half tube 512 assembled with the first half tube 511, a first inner space 5111 is provided in the first half tube 511 and a second inner space 5121 is provided in the second half tube 512, a first accommodating portion 5114 is extended upward from the first half tube 511 and a second accommodating portion 5124 is extended upward from the second half tube 512. An inside of the first accommodating portion 5114, an inside of the second accommodating portion 5124, the first inner space 5111 and the second inner space 5121 are provided for disposal of the feeder 52 and the tube handle 55. The first half tube 511 is provided with a first holding part 5112 and the second half tube 512 is provided with a second holding part 5122, wherein the first holding part 5112 and the second holding part 5122 are adjacent to one end of the wire drum 41. The first holding part 5112 includes a first half sleeve hole 5110 and the second holding part 5122 includes a second half sleeve hole 5120, wherein the first half sleeve hole 5110 and the second half sleeve hole 5120 are assembled to provide a sleeve hole for disposal of one end of the tube handle 55 where is opposite to the feeder 52. A first semicircular hole 5113 is provided at one end of the first half tube 511 opposite to the first half sleeve hole 5110, and a second semicircular hole 5123 is provided at one end of the second half tube 512 opposite to the second half sleeve hole 5120, wherein the first semicircular hole 5113 and the second semicircular hole 5123 are assembled as a round hole for the spring wire 42 to protrude or take up. The groove portion 510 of the telescopic tube 51 is divided into a first groove 5115 at an inner top of the first accommodating portion 5114 and a second groove 5125 at inner top of the second accommodating portion 5124 to provide the folded end 561 of the elastic plate 56 for embedding therein. The first half tube 511 and the second half tube 512 are joined in a manner such that a protruding part 513 and a recessed part 514 are provided at an joining position of the first half tube 511 and the second half tube 512, inner peripheries of the first half tube 511 and the second half tube 512 are respectively provided with a plurality of locking parts 515 for a plurality of screws 516 to be screwed and inserted, so as to combine and fix the first half tube 511 with the second half tube 512. Through the plurality of locking parts 515 are adjacent to the first accommodating portion 5114 and the second accommodating portion 5124, the telescopic tube 51 can be pushed forward to enable the plurality of locking parts 515 abutting against the feeder 52, so as to prevent the telescopic tube 51 from being continuously pushed further forward.

In one embodiment, the feeder 52 comprises a first feeder body 521 and a second feeder body 522 assembled with the first feeder body 521 from top to bottom, a flange joint portion 523 is formed in a direction extended upward from the first feeder body 521, a hollow hole 524 is provided in the flange joint portion 523, a top end of the flange joint portion 523 is provided with a notch 5231, and a bottom end of the hollow hole 524 of the flange joint portion 523 is provided with an adaptor 5241 and a guiding tenon 5242 protruding from an inner edge of the adaptor 5241, so that the movable bearing 53 is able to be inserted from the hollow hole 524 of the flange joint portion 523. The first feeder body 521 is extended downward to form an engaging convex body 5211. Two fixing parts 525 which are relatively staggered and obliquely disposed on an inner periphery of one side of the second feeder body 522, one side of the two fixing parts 525 is axially connected with the two fixed bearings 54, and a slot 5221 is provided on an inner periphery of one end of the second feeder body 522 where is corresponding to the engaging convex body 5211. Inner peripheries of the first feeder body 521 and the second feeder body 522 are respectively provided with a plurality of locking portions 526 (527) and a plurality of screws 528 to screw and insert into the plurality of locking portions 526, 527, so as to combine and fix the first feeder body 521 with the second feeder body 522.

The movable bearing 53 comprises a movable fixing shaft 531, a bearing 532, a spring 533 and a steel ball 534, wherein a flange joint body 535 is provided at a top of the movable fixing shaft 531 for placing the steel ball 534, the flange joint body 535 extends downwardly to form a vertical rod 536, wherein an outer diameter of the vertical rod 536 is smaller than an outer diameter of the flange joint body 535, an end of the vertical rod 536 is provided with a groove 537 to be inserted by the bearing 532, a first fixing member 538 is inserted into the end of the vertical rod 536 to axially connect the bearing 532 so that the bearing 532 is capable of rotating in the groove 537. The spring 533 is sleeved on an outer periphery of the vertical rod 536 and abutted between the flange joint body 535 and the first fixing member 538, an elongated slot 5361 is provided at an outer side of the vertical rod 536 where the first fixing member 538 passes through, and the movable fixing shaft 531 is obliquely inserted into the hollow hole 524 of the flange joint portion 523, and the bearing 532 is axially connected in the groove 537, so that the flange joint body 535 of the movable fixing shaft 531 is abutted on the adaptor 5241, and the movable fixing shaft 531 is capable of moving upward and downward through the disposal of the spring 533 sleeved on the outer periphery of the vertical rod 536, and the movable bearing 53 is capable of moving upward and downward in the hollow hole 524 of the flange joint portion 523.

Two second fixing members 541 are respectively inserted into the two fixing parts 525 to axially connect the two fixed bearings 54, and enable the two fixed bearings 54 rotating on one side of the fixing parts 525.

The tube handle 55 comprises a convex tube section 551 disposed at one end of the tube handle 55, an outer sleeve 552 disposed at the other end of the tube handle 55, and a via hole 553 is located in the tube handle 55. The convex tube section 551 is provided with a convex tube section slot 554 and a block 555 which is disposed opposite to the convex tube section slot 554 on an outer side of the convex tube section 551, the convex tube section slot 554 is provided for engaging and fixing the engaging convex body 5211 of the first feeder body 521, and the block 555 is jammed and fixed in the slot 5221 of the second feeder body 522. The outer sleeve 552 of the tube handle 55 abuts on the round convex portion 413 of the front cover 411, the via hole 553 of the tube handle 55 is inserted by the flange tube 414, and the plurality of convex strips 4141 of the flange tube 414 contact with the via hole 553, and the flange tube 414 of the wire drum 41 is able to be rotated in the via hole 553.

The folded end 561 of the elastic plate 56 is in an elongate shape, the other end of the elastic plate 56 is inclined downward to form a hook 562, the folded end 561 of the elastic plate 56 is embedded in the first groove 5115 at an inner top end of the first accommodating portion 5114 and the second groove 5125 at the second accommodating portion 5124, and the hook 562 of the elastic plate 56 is located in the hollow hole 524 of the flange joint portion 523 and the notch 5231 of the flange joint portion 523.

Figure 10:
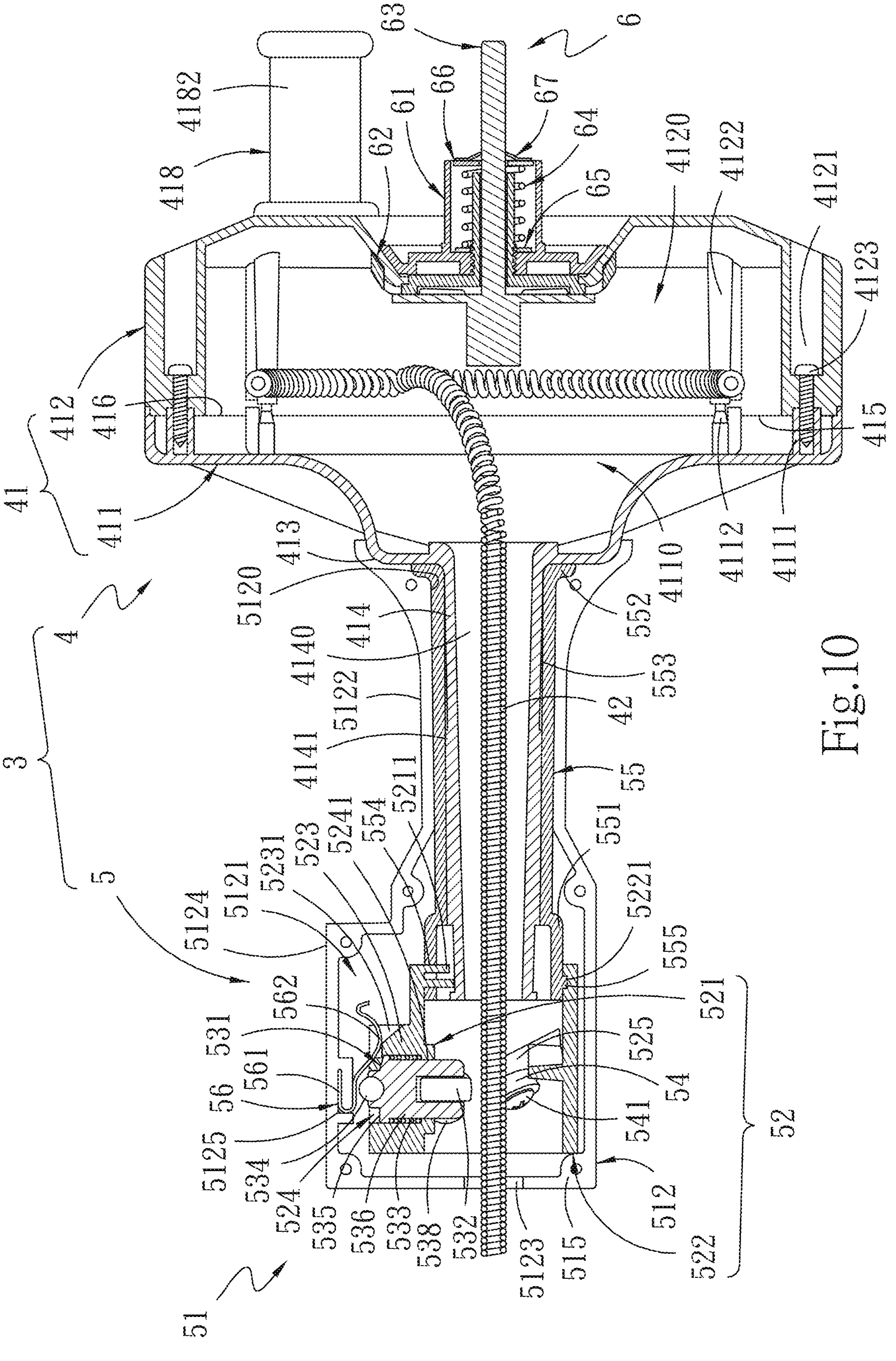
FIG. 10 is a combined cross-sectional view of the pipe cleaner of FIG. 3.
Figure 11A:
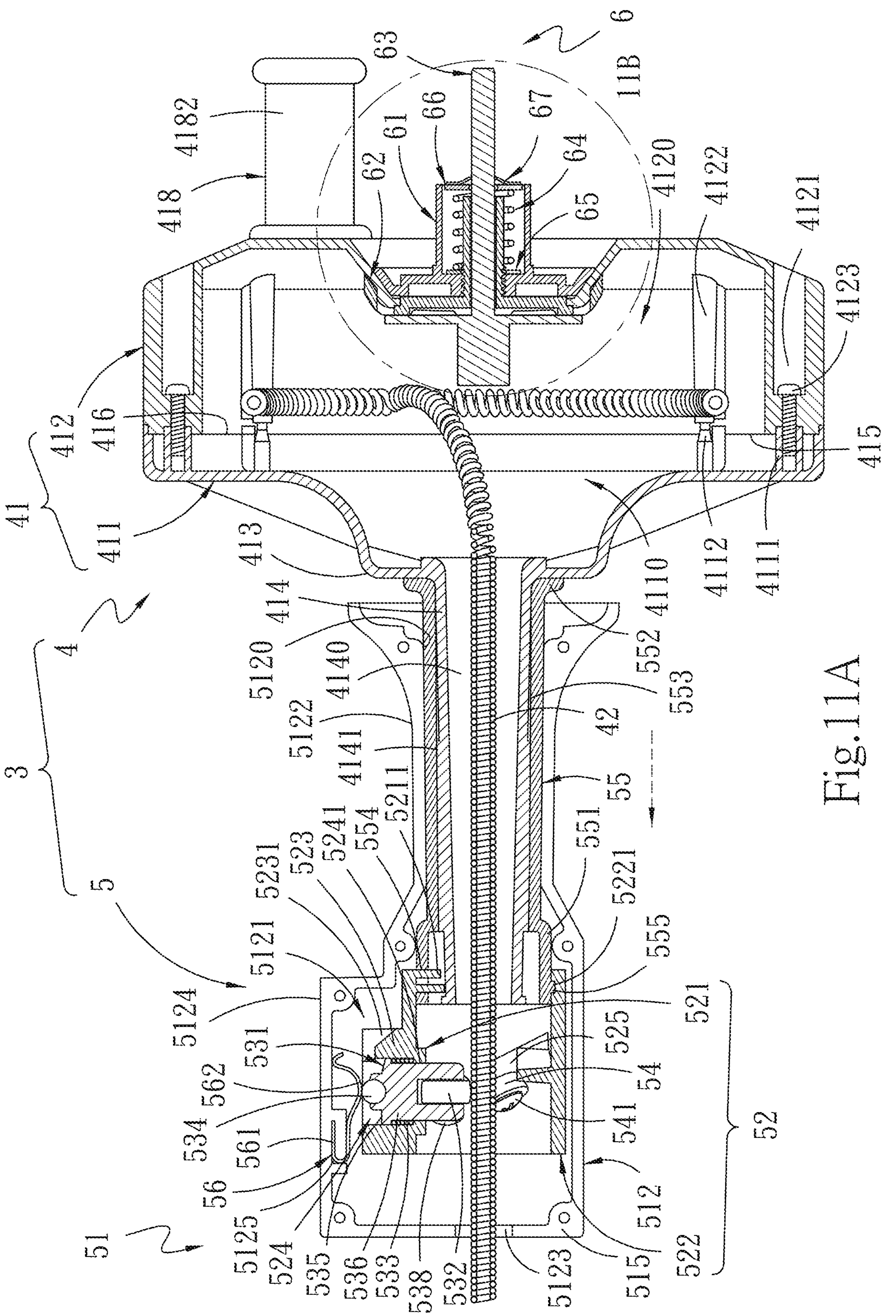
FIG. 11A is a cross-sectional view of a telescopic tube of the feed unit of the pipe cleaner of FIG. 10 being pushed forward.
Figure 11B:
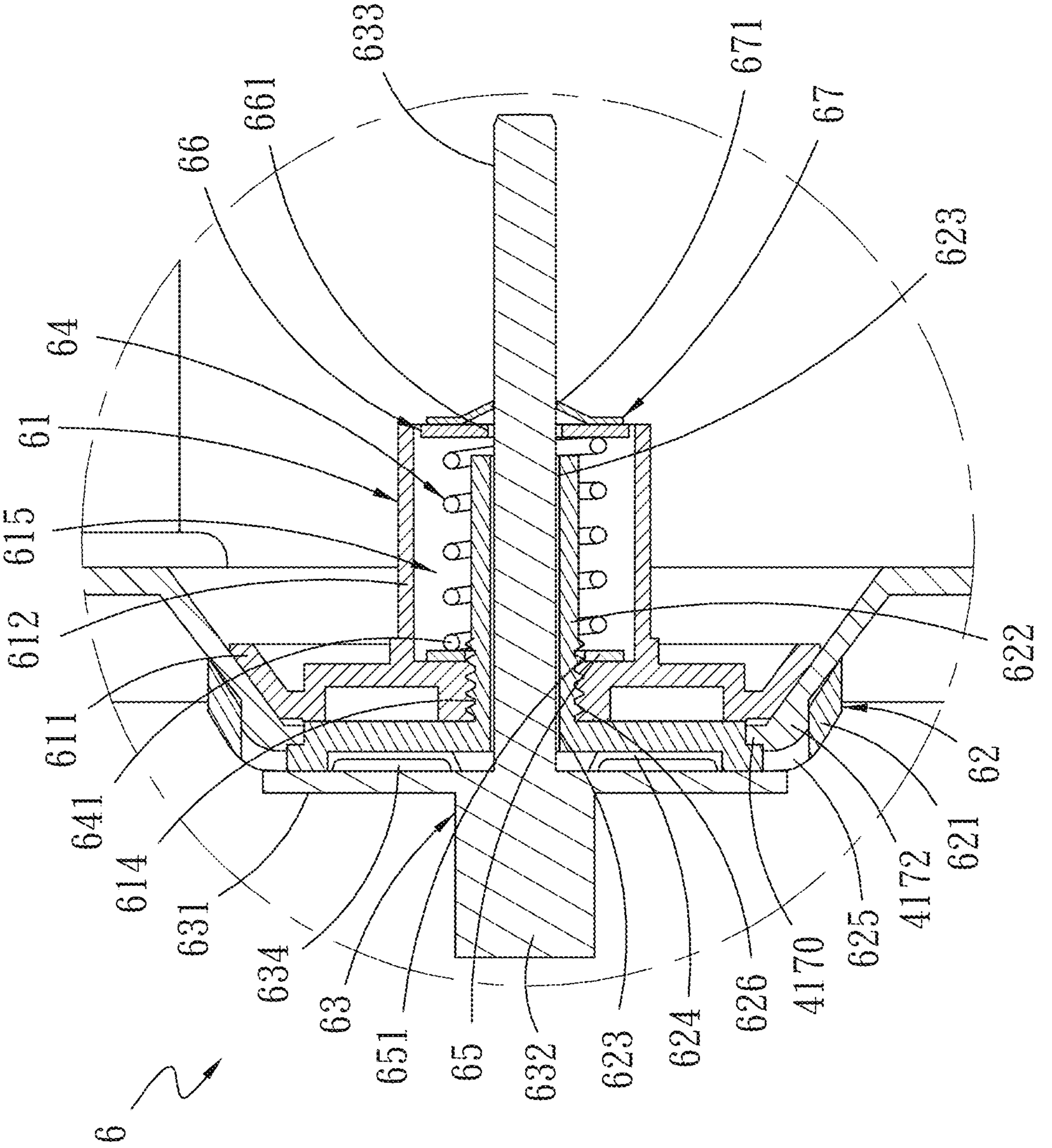
FIG. 11B is an enlarged cross-sectional view of 11B in FIG. 11A.

Please refer to FIG. 10 and FIG. 11A, when a pipeline of a drain pipe is blocked, a user has to use the pipe cleaner 3 to clear the drain pipe, the user holds the small handle 418 of the wire drum 41 with one hand to rotate the wire drum 41 and drive the spring wire 42 to rotate clockwise, and the other hand holds as well as pushes the telescopic tube 51 forward to press against the movable bearing 53 with the hook 562 of the elastic plate 56. The movable bearing 53 is pressed downward and actuated with the fixed bearings 54 through the disposal of the spring 533 sleeved on the outer periphery of the vertical rod 536, and the spring wire 42 evenly pressed between the movable bearing 53 and the fixed bearings 54 is rotatably fed. The hook 562 of the elastic plate 56 is detached from the movable bearing 53 when the telescopic tube 51 is pulled backward, and the movable bearing 53 is not pressed down by the hook 562 of the elastic plate 56, the movable bearing 53 rises through disposal of the spring 533 sleeved on the outer periphery of the vertical rod 536, so that the movable bearing 53 and the fixed bearings 54 are not actuated to stop feeding of the spring wire 42. Contrarily, when the wire drum 41 is counterclockwise rotation to drive the spring wire 42 to rotate counterclockwise, the telescopic tube 51 is pushed forward to press against the movable bearing 53 with the hook 562 of the elastic plate 56, the movable bearing 53 is pressed downward and actuated with the fixed bearings 54 through disposal of the spring 533 sleeved on the outer periphery of the vertical rod 536, the spring wire 42 is evenly pressed between the movable bearing 53 and the fixed bearings 54, and the spring wire 42 is taken up into the wire drum 41. The hook 562 of the elastic plate 56 is detached from the movable bearing 53 when the telescopic tube 51 is pulled backward, the movable bearing 53 is not pressed down by the hook 562 of the elastic plate 56, and the movable bearing 53 rises through disposal of the spring 533 sleeved on the outer periphery of the vertical rod 536, so that the movable bearing 53 and the fixed bearings 54 are not actuated to stop taking up the spring wire 42 in order to achieve convenient operation.

Figure 11C:
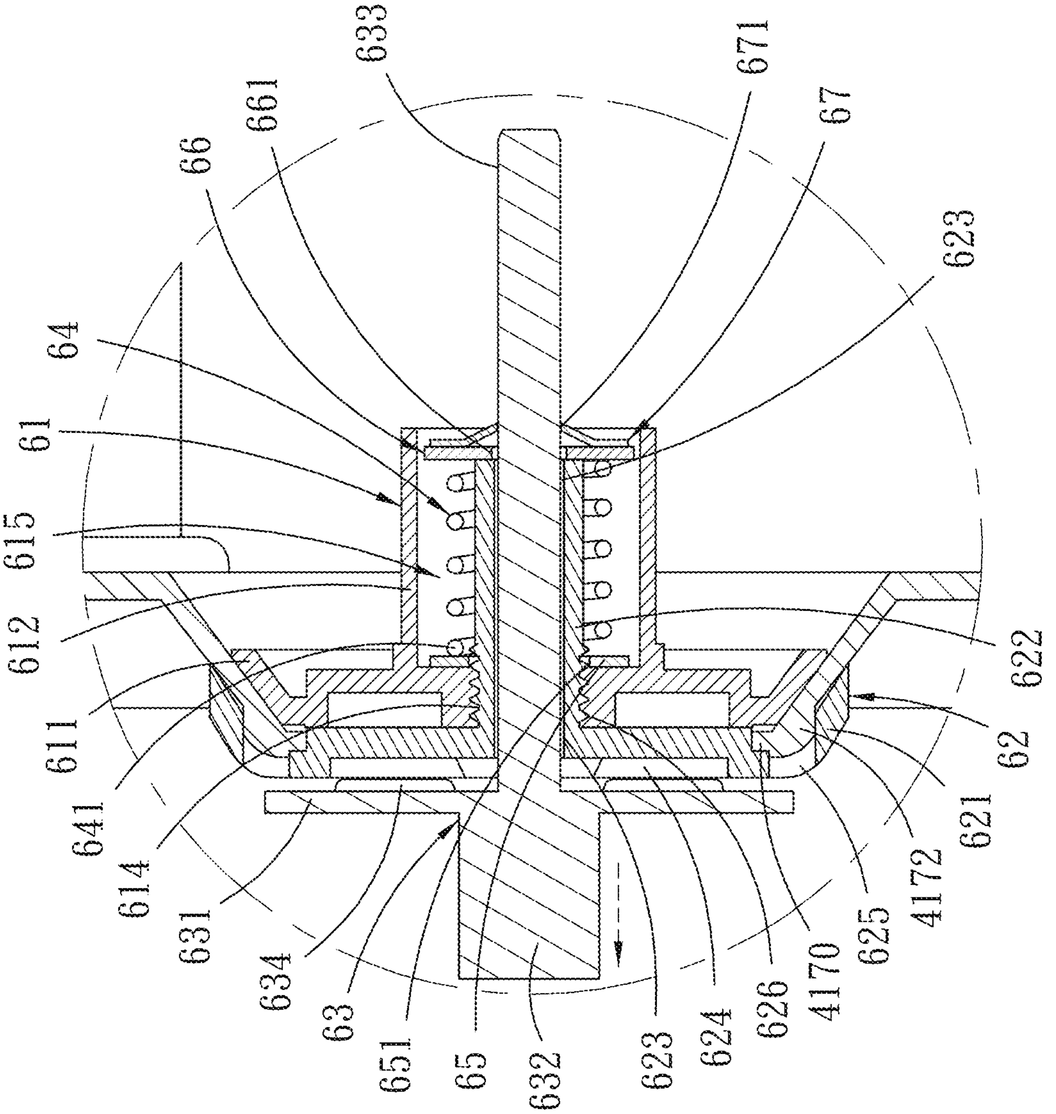
FIG. 11C is a schematic diagram of clutching of the clutch device of FIG. 11B.
Figure 12:
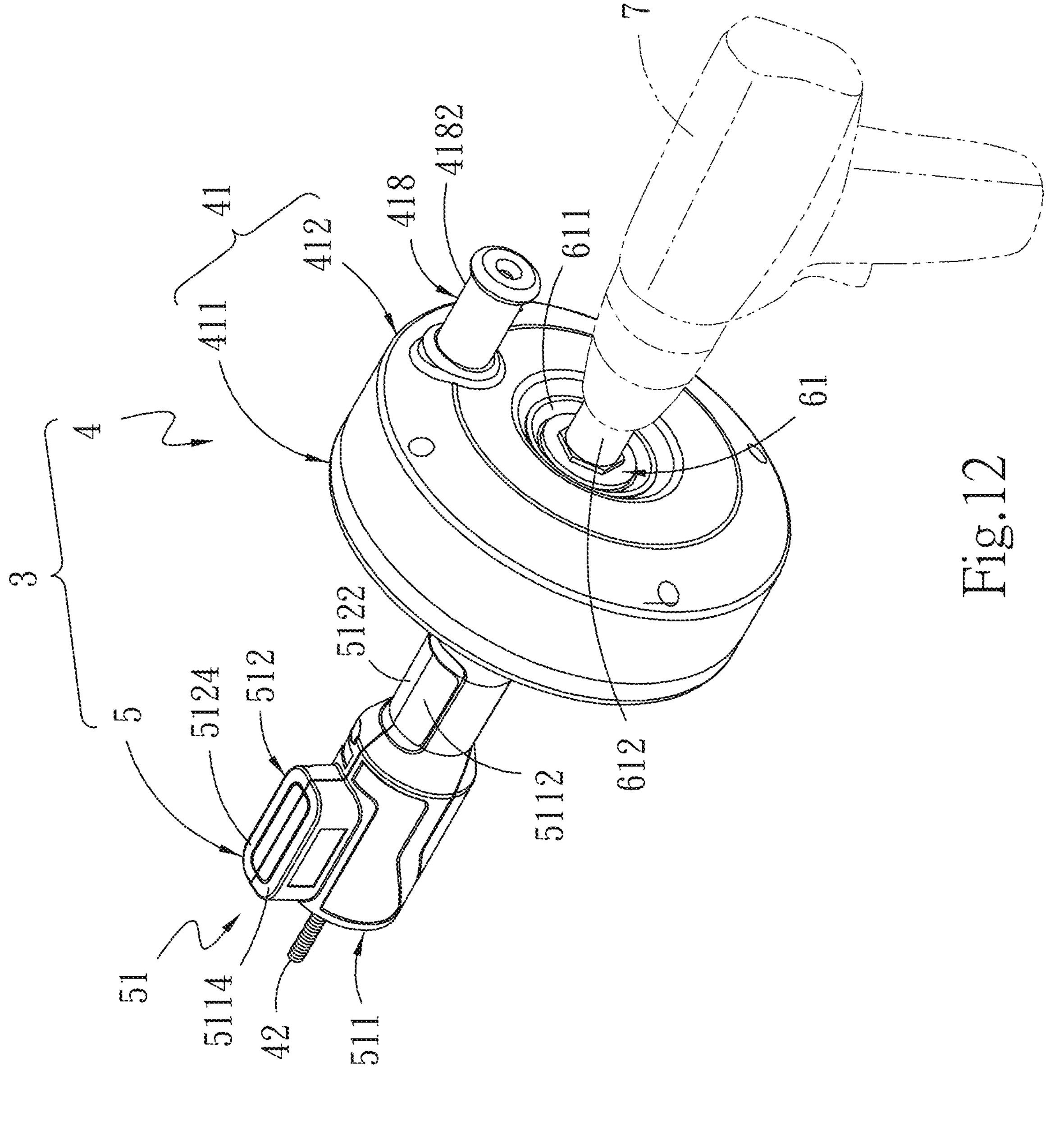
FIG. 12 is a perspective view of an electric drill installed on a shaft of a wire drum of the pipe cleaner of FIG. 3.

Please refer to FIG. 8, FIG. 9, FIG. 10 and FIG. 11B. The take-up unit 4 further includes a clutch device 6 installed on the rear cover 412 of the wire drum 41. The clutch device 6 comprises a first sleeve 61, a second sleeve 62, a central shaft 63, a compression spring 64, a first gasket 65, a second gasket 66 and a fixing plate 67. The first sleeve 61 is provided with a cover 611 abutting on the concave portion 417 of the rear cover 412, an inside of the cover 611 extends outward to form an outer cylinder 612 with a third opening 613, and the inside of the cover 611 is provided with a screw hole 614 communicating with the third opening 613. A chamber 615 is formed inside the outer cylinder 612 for sleeving the compression spring 64, a bottom of the chamber 615 is abutted by the first gasket 65 and an end 641 of the compression spring 64, the second sleeve 62 is provided with a convex cover 621 embedded and positioned in the inverted convex hole 4171 of the convex rim 4170, and a convex cover rod 622 on the convex cover 621 for sleeving with the compression spring 64. A shaft hole 623 is disposed inside the convex cover 621 and the convex cover rod 622, the convex cover 621 includes a plurality of embedding grooves 624 adjacent to the shaft hole 623, and a plurality of holes 625 are located on an outer periphery of the convex cover 621 for the convex dots 4172 of the concave portion 417 to tenon. An external screw thread 626 is provided at one end of the convex cover rod 622 to screw joint with the screw hole 614 of the cover 611. The central shaft 63 is provided with a disc surface 631 with a hexagon head 632, and a shaft 633 is located at one side of the disc surface 631 opposite to the hexagon head 632. The shaft 633 protrudes from the convex cover rod 622. The disc surface 631 is provided with a plurality of convex embedding parts 634 adjacent to the shaft 633 and corresponding to one side of the second sleeve 62 for embedding with or detaching from the plurality of embedding grooves 624, and a plurality of abutting convex dots 635 disposed between the plurality of convex embedding parts 634 to abut against the convex cover 621. The first gasket 65 includes a first inner hole 651, the second gasket 66 includes a second inner hole 661, and the fixing plate 67 includes a third inner hole 671, wherein the external screw thread 626 of the convex cover rod 622 is inserted into the first inner hole 651, and one end of the shaft 633 opposite to the hexagon head 632 is inserted into the second inner hole 661 of the second gasket 66 and protruded out from the third inner hole 671 of the fixing plate 67, so that the fixing plate 67 is fixed on the second gasket 66 together with the shaft 633, thereby the shaft 633 is capable of moving forward and backward in the chamber 615 of the outer cylinder 612 through an action of the compression spring 64 as shown in FIG. 11C.

Please refer to the embodiments shown in FIG. 10, FIG. 11B, FIG. 11C and FIG. 12, the pipe cleaner 3 may also include an electric drill 7 to be installed on the shaft 633 of the wire drum 41 for replacing the small handle 418. The user holds the electric drill 7 with one hand to rotate the wire drum 41 and the spring wire 42 clockwise or counterclockwise, and the principle that the telescopic tube 51 is pushed forward and pulled backward with the one hand are disclosed in FIG. 3, FIG. 10 and FIG. 11A of the invention, and thus will not be repeated herein. When the spring wire 42 of the pipe cleaner 3 is fed into the drain pipe and hits an oversized obstruction which blocks the drain pipe, the central shaft 63 will be pushed forward to disengage the disc surface 631 and the plurality of convex embedding parts 634 from the convex cover 621 the plurality of embedding grooves 624 since a force of the compression spring 64 is less than a force of the central shaft 63 in the clutch device 6, thereby the central shaft 63 is idled without driving the wire drum 41 to rotate clockwise. By disposal of the clutch device 6 on the take-up unit 4, the spring wire 42 is prevented to be deformed and knotted from overly twisting in order to remind the user to stop clearing the pipeline immediately.

What is claimed is:

1. An auto-feed pipe cleaner for cleaning pipelines, the auto-feed pipe cleaner comprising:

a take-up unit, comprising a wire drum and a spring wire, wherein the wire drum comprises a front cover and a rear cover assembled with the front cover, a flange tube is provided in an extension direction at one side of the front cover without assembling with the rear cover, and a through hole is formed in the flange tube for communicating with an inner hollow of the front cover, and the front cover includes a first opening communicating with the inner hollow of the front cover and facing toward one end of the flange tube, the rear cover includes a second opening communicating with an inner hollow of the rear cover and corresponding to one end of the front cover, and the rear cover is provided with a small handle at a side opposite to the second opening to drive the wire drum rotating, the spring wire is accommodated in the inner hollows of the front cover and the rear cover, and one end of the spring wire protrudes from the through hole of the flange tube; and a feed unit, comprising a telescopic tube, a feeder, a tube handle and an elastic plate, wherein an inside of the telescopic tube is hollow, an inner top of the telescopic tube is provided with a groove portion, the feeder is disposed at the inside of the telescopic tube, and a movable bearing and two fixed bearings are obliquely disposed in the feeder, the tube handle is sleeved on the flange tube of the front cover, one end of the tube handle is embedded with one end of the feeder and disposed at the inside of the telescopic tube which is capable of moving forward and backward outside the feeder and the tube handle, and a folded end of the elastic plate is embedded in the groove portion of the telescopic tube; the wire drum is rotated to drive the spring wire to rotate clockwise or anti-clockwise; when the telescopic tube is pushed forward to press against the movable bearing, the movable bearing is pressed downward and actuated with the fixed bearings, the spring wire is evenly pressed between the movable bearing and the fixed bearings, and the spring wire is fed or taken up into the wire drum; and when the telescopic tube is pulled backward, the movable bearing rises and is not actuated with the fixed bearings, and the spring wire is not fed nor taken up into the wire drum.

2. The auto-feed pipe cleaner as claimed in claim 1, wherein an outer periphery of the flange tube of the front cover comprises a plurality of convex strips disposed at intervals, and a round convex portion is provided at the extension direction that the front cover connected with the flange tube, and the front cover comprises a plurality of locking holes and a plurality of protruding rods disposed at intervals on an inner periphery of the first opening, and wherein the rear cover comprises a plurality of fixing rods and a plurality of sleeve rods disposed at intervals on an inner periphery of the second opening, the plurality of fixing rods are inserted by a plurality of screws to be locked with the plurality of locking holes, and the plurality of protruding rods are correspondingly connected with the plurality of sleeve rods, and a concave portion is provided at a side opposite to the second opening of the rear cover, and the concave portion is provided with a convex rim with an inverted convex hole at a side that the second opening is located, and a plurality of convex dots are disposed at intervals on an outer periphery of the convex rim, the small handle is provided with a convex connecting rod, and a hollow cylinder is embedded with one end of the convex connecting rod and is sleeved on the convex connecting rod.

3. The auto-feed pipe cleaner as claimed in claim 2, wherein the telescopic tube comprises a first half tube and a second half tube assembled with the first half tube, a first inner space is provided in the first half tube and a second inner space is provided in the second half tube, a first accommodating portion is extended upward from the first half tube and a second accommodating portion is extended upward from the second half tube, and an inside of the first accommodating portion and an inside of the second accommodating portion, the first inner space and the second inner space are provided for disposal of the feeder and the tube handle, the first half tube is provided with a first holding part and the second half tube is provided with a second holding part, and the first holding part and the second holding part are adjacent to one end of the wire drum, the first holding part includes a first half sleeve hole and the second holding part includes a second half sleeve hole, and the first half sleeve hole and the second half sleeve hole are assembled to provide a sleeve hole for disposal of one end of the tube handle, a first semicircular hole is provided at one end of the first half tube opposite to the first half sleeve hole, and a second semicircular hole is provided at one end of the second half tube opposite to the second half sleeve hole, the first semicircular hole and the second semicircular hole are assembled as a round hole for the spring wire to protrude or take up, wherein the groove portion of the telescopic tube is divided into a first groove at an inner top of the first accommodating portion and a second groove at inner top of the second accommodating portion to provide a folded end of the elastic plate for embedding therein, and a protruding part and a recessed part are provided at an joining position of the first half tube and the second half tube, inner peripheries of the first half tube and the second half tube are respectively provided with a plurality of locking parts for a plurality of screws to be screwed and inserted to combine and fix the first half tube with the second half tube.

4. The auto-feed pipe cleaner as claimed in claim 3, wherein the feeder comprises a first feeder body and a second feeder body assembled with the first feeder body from top to bottom, a flange joint portion is formed in a direction extended upward from the first feeder body, a hollow hole is provided in the flange joint portion, a top end of the flange joint portion is provided with a notch, and a bottom end of the hollow hole of the flange joint portion is provided with an adaptor and a guiding tenon protruding from an inner edge of the adaptor, and the movable bearing is inserted from the hollow hole of the flange joint portion, the first feeder body is extended downward to form an engaging convex body, the second feeder body is provided with two fixing parts which are relatively staggered and obliquely disposed on an inner periphery of one side of the second feeder body, one side of the two fixing parts is y axially connected with the fixed bearings, and a slot is provided on an inner periphery of one end of the second feeder body where is corresponding to the engaging convex body, inner peripheries of the first feeder body and the second feeder body are respectively provided with a plurality of locking portions, and a plurality of screws to screw and insert into the plurality of locking portions to combine and fix the first feeder body with the second feeder body.

5. The auto-feed pipe cleaner as claimed in claim 4, wherein the movable bearing comprises a movable fixing shaft, a bearing, a spring and a steel ball, a flange joint body is provided at a top of the movable fixing shaft for placing the steel ball, the flange joint body extends downwardly to form a vertical rod, and an outer diameter of the vertical rod is smaller than an outer diameter of the flange joint body, an end of the vertical rod is provided with a groove to be inserted by the bearing, and a first fixing member is inserted into the end of the vertical rod to axially connect the bearing, and the bearing rotates in the groove, the spring is sleeved on an outer periphery of the vertical rod and abutted between the flange joint body and the first fixing member, an elongated slot is provided at an outer side of the vertical rod where the first fixing member passes through, the movable fixing shaft is obliquely inserted into the hollow hole of the flange joint portion, and the bearing is axially connected in the groove, and the flange joint body of the movable fixing shaft is abutted on the adaptor, the movable fixing shaft moves upward and downward through the disposal of the spring sleeved on the outer periphery of the vertical rod, and the movable bearing moves upward and downward in the hollow hole of the flange joint portion.

6. The auto-feed pipe cleaner as claimed in claim 5, wherein two second fixing members are respectively inserted into the two fixing parts to axially connect the two fixed bearings, and enable the two fixed bearings rotating on one side of the fixing parts.

7. The auto-feed pipe cleaner as claimed in claim 6, wherein the tube handle comprises a convex tube section disposed at one end of the tube handle, an outer sleeve disposed at an other end of the tube handle, and a via hole is located in the tube handle, the convex tube section is provided with a convex tube section slot and a block which is disposed opposite to the convex tube section slot on an outer side of the convex tube section, the convex tube section slot is provided for engaging and fixing the engaging convex body of the first feeder body, and the block is jammed and fixed in the slot of the second feeder body, the outer sleeve of the tube handle abuts on the round convex portion of the front cover, the via hole of the tube handle is inserted by the flange tube, and the plurality of convex strips of the flange tube contact with the via hole, and the flange tube of the wire drum is rotated in the via hole.

8. The auto-feed pipe cleaner as claimed in claim 4, wherein the folded end of the elastic plate is an elongate shape, and an other end of the elastic plate is inclined downward to form a hook, and the hook of the elastic plate is located in the hollow hole of the flange joint portion and the notch of the flange joint portion.

9. The auto-feed pipe cleaner as claimed in claim 2, wherein the take-up unit further includes a clutch device installed on the rear cover of the wire drum.

10. The auto-feed pipe cleaner as claimed in claim 9, wherein the clutch device comprises a first sleeve, a second sleeve, a central shaft, a compression spring, a first gasket, a second gasket, and a fixing plate, the first sleeve is provided with a cover abutting on the concave portion of the rear cover, and an inside of the cover extends outward to form an outer cylinder with a third opening, and the inside of the cover is provided with a screw hole communicating with the third opening, a chamber is formed from inside the outer cylinder for sleeving the compression spring, a bottom of the chamber is abutted by the first gasket and an end of the compression spring, the second sleeve is provided with a convex cover embedded and positioned in the inverted convex hole of the convex rim, and a convex cover rod on the convex cover for sleeving with the compression spring, a shaft hole is disposed inside the convex cover and the convex cover rod, the convex cover includes a plurality of embedding grooves adjacent to the shaft hole, and a plurality of holes are located on an outer periphery of the convex cover for the convex dots of the concave portion to tenon, an external screw thread is provided at one end of the convex cover rod to screw joint with the screw hole of the cover, the central shaft is provided with a disc surface with a hexagon head, and a shaft is located at one side of the disc surface opposite to the hexagon head, and the shaft protrudes from the convex cover rod, the disc surface is provided with a plurality of convex embedding parts adjacent to the shaft and corresponding to one side of the second sleeve for embedding with or detaching from the plurality of embedding grooves, and a plurality of abutting convex dots disposed between the plurality of convex embedding parts to abut against the convex cover, the first gasket includes a first inner hole, the second gasket includes a second inner hole, and the fixing plate includes a third inner hole, and wherein the external screw thread of the convex cover rod is inserted into the first inner hole, and one end of the shaft opposite to the hexagon head is inserted into the second inner hole of the second gasket and protruded out from the third inner hole of the fixing plate, and the fixing plate is fixed on the second gasket together with the shaft, the second gasket and the fixing plate into one body, thereby the shaft is capable of moving forward and backward in the chamber of the outer cylinder through an action of the compression spring.

* * * * *